United States Patent [19]

Bowbin

[11] 4,065,852
[45] Jan. 3, 1978

[54] NUCLEAR CYLINDER SEAL CONSTRUCTION

[75] Inventor: John F. Bowbin, Elmhurst, Ill.

[73] Assignee: Miller Fluid Power Corporation, Bensenville, Ill.

[21] Appl. No.: 705,946

[22] Filed: July 16, 1976

[51] Int. Cl.² ............................................. F16C 33/72
[52] U.S. Cl. ....................................................... 308/3.5
[58] Field of Search ............................ 308/3.5, 187.1; 277/187, 188

[56] References Cited

U.S. PATENT DOCUMENTS

| 3,190,702 | 6/1965 | Flick | 308/3.5 |
|---|---|---|---|
| 3,334,549 | 8/1967 | Sheldon | 308/3.5 X |
| 3,556,617 | 1/1971 | Thammer et al. | 308/3.5 |

*Primary Examiner*—Joseph F. Peters, Jr.

*Assistant Examiner*—Gene A. Church
*Attorney, Agent, or Firm*—Wegner, Stellman, McCord, Wiles & Wood

[57] ABSTRACT

A hydraulic snubber device arranged for facilitated servicing of a secondary seal thereof. A bushing removably mounted to the head of the device cooperates therewith to retain a split annular seal element in sealed association with a piston rod extending outwardly therethrough. A bushing is movable on the rod sufficiently to expose the seal for selective removal and installation when desired. The snubber is adapted for use in a radioactive environment wherein the split seal may suffer degradation such as from radiation and permits the replacement of the seal without disconnecting elements connected to the end of the piston rod so as to provide minimum downtime in servicing the installation.

15 Claims, 5 Drawing Figures

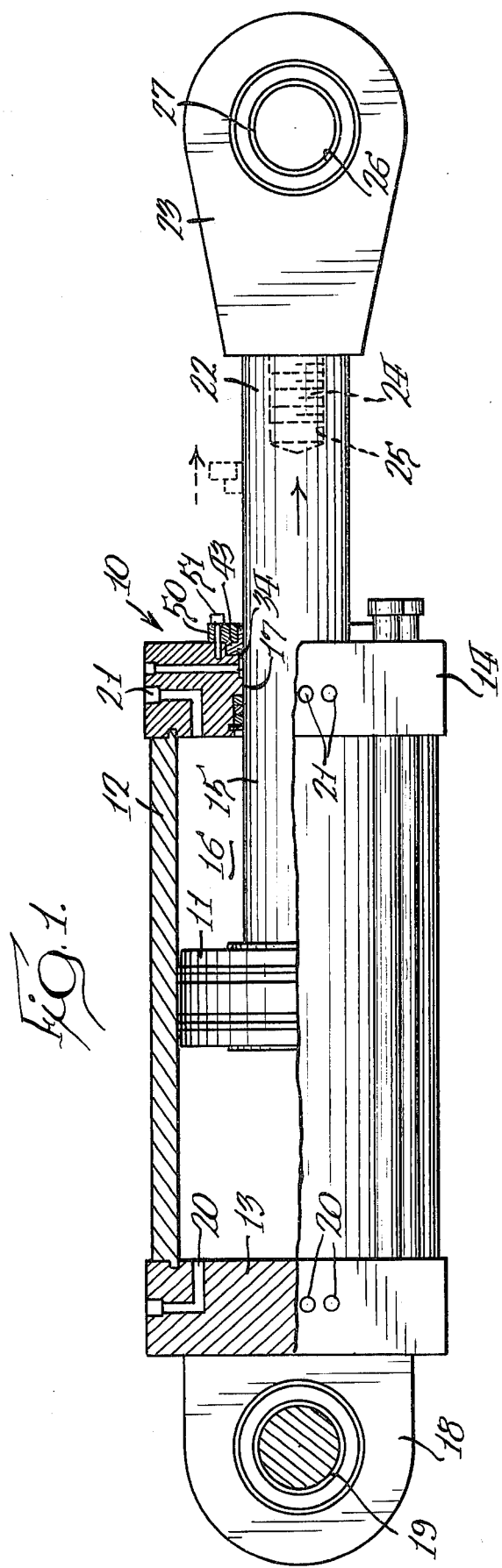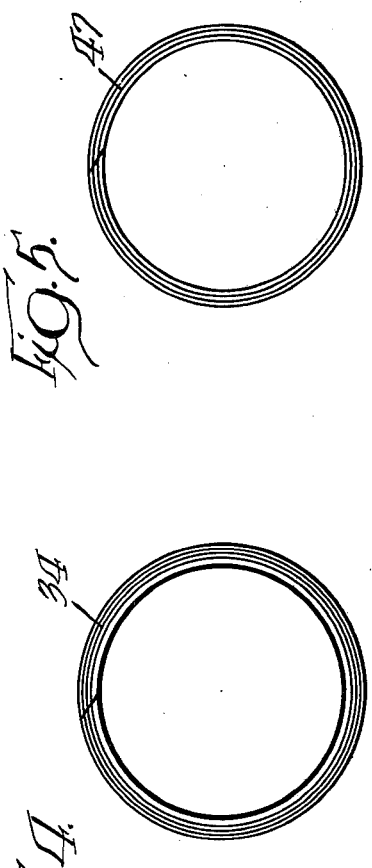

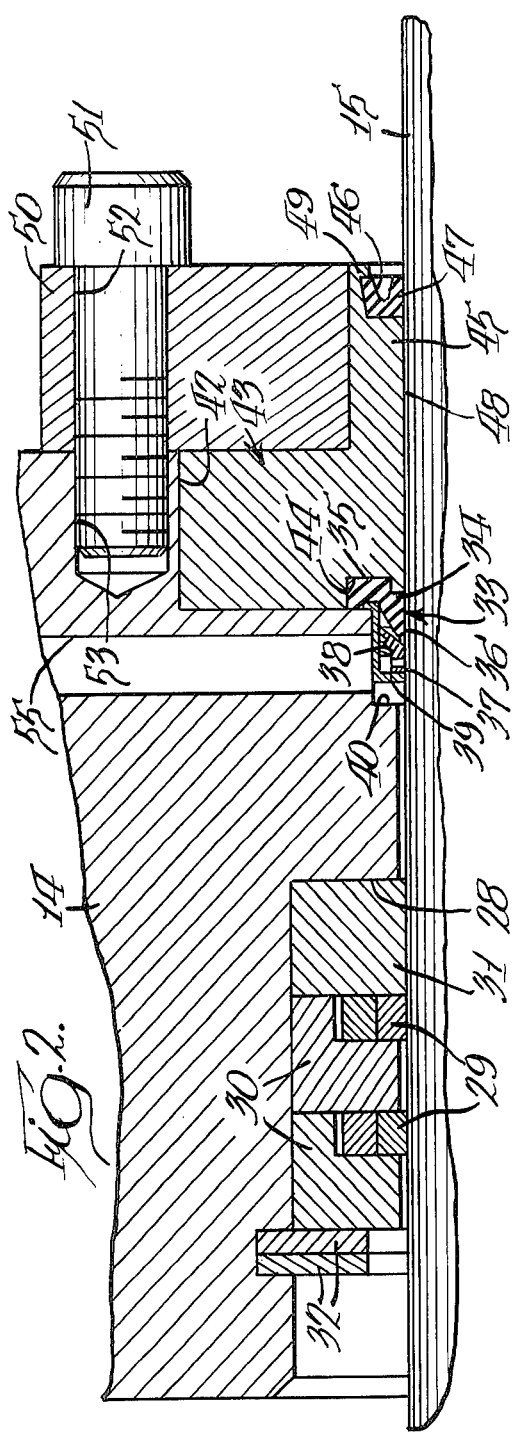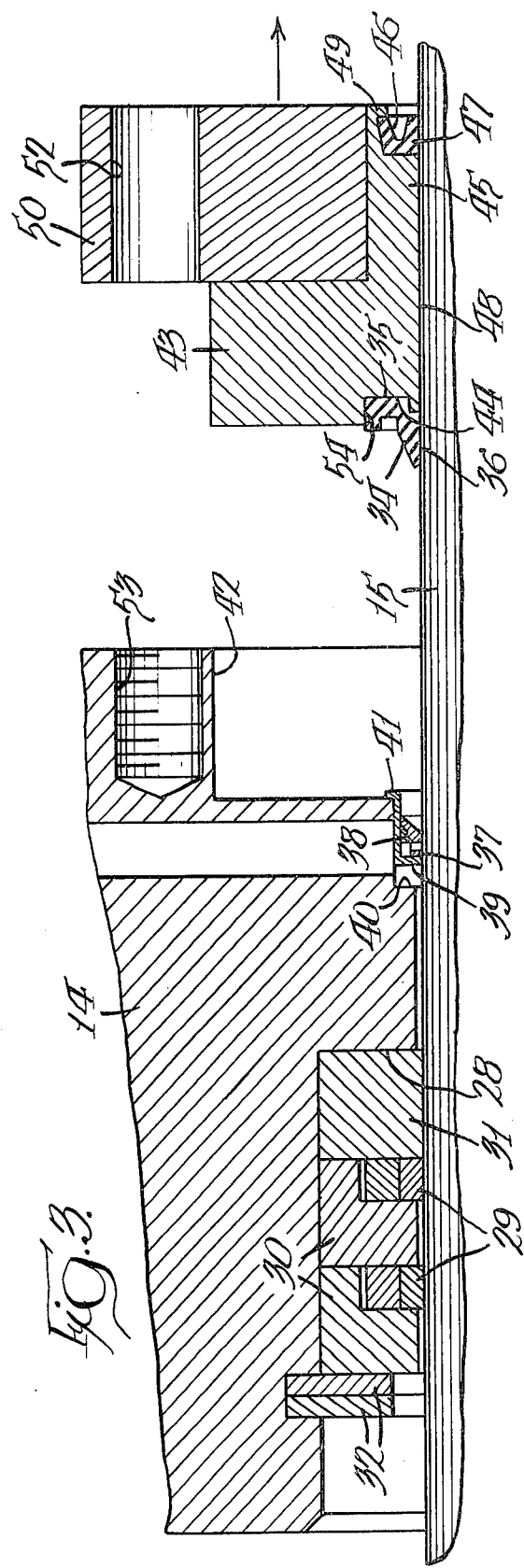

NUCLEAR CYLINDER SEAL CONSTRUCTION

BACKGROUND OF THE INVENTION

1. Field of the Invention

This invention relates to fluid-operated devices and in particular to hydraulic snubbers and the like adapted for use in a radioactive environment.

2. Description of the Prior Art

In U.S. Letters Pat. No. 3,190,702, of Francis S. Flick, which patent is owned by the assignee hereof, a sealing structure for piston and cylinder devices is illustrated having an improved resilient annular seal including a portion mounted in a bushing recess and another portion engaged by a follower ring which is biased by a wave spring to effect a sealing engagement thereof with an outer surface of a piston rod. Thus, the seal has both a dynamic and a static sealing portion adapted for use in machine tool grade piston and cylinder devices. The bushing is removably secured to the head of the piston and cylinder device by a removable retainer plate so that servicing of the seal may be effected by the axial removal of the retainer plate and bushing together with the seal from the outer end of the piston rod.

The outer end of the piston rod may conventionally have attached thereto other elements, and in the Flick patent, a threaded securing portion is shown at the outer end of the rod. One use of such a device is as a hydraulic snubber in a nuclear power installation wherein the device is disposed in a radioactive environment. In such an environment, nonmetallic seals such as that disclosed in the Flick patent may suffer radiation degradation requiring replacement. One conventional nuclear power installation of such type utilizes a rod eye threadedly connected to the outer end of the piston rod. The rod eye serves as a connector to a tubular or cylindrical element which is extended therethrough after the rod eye is fully threaded onto the piston rod end.

Where it is desired to service the seal of such a device, it has heretofore been necessary to remove the rod eye so as to permit the axial withdrawal of the annular bushing and seal. To permit the unthreading removal of the rod eye, the element extended through the eye must first be withdrawn.

Such snubbers protect the elements connected thereto from excessive loads as may occur in a seismic event relating to the nuclear power equipment. The snubber permits a slow movement of the elements at any time, such as may be caused by differential thermal expansion while yet providing a snubbing action relative to any sudden large force applied thereto. In such nuclear powered installations, it is necessary to assure proper sealing action at all times. A substantial number of such snubbers may be employed in such an installation. The Nuclear Regulatory Commission has promulgated a directive that from and after the time a hydraulic snubber has been determined to be inoperable, continued reactor operation is permissible only during the succeeding 72 hours unless the snubber is sooner made operable. As such snubbers may be relatively large and the elements connected thereto relatively bulky, the 72-hour limit presents a serious problem where the apparatus must be effectively disassembled to permit the replacement of the snubber seal.

Not only is there substantial difficulty involved in such assembly and disassembly of such relatively large hydraulic snubbers, but very often such snubbers are located in relatively inaccessible areas. Thus, the maintenance of such hydraulic devices in such environments presents a serious problem.

SUMMARY OF THE INVENTION

The present invention comprehends an improved snubber construction utilizing an extremely simple seal arrangement permitting facilitated, expedited replacement of such a seal with effectively minimum downtime.

More specifically, the invention comprehends the provision of such a device wherein the seal is arranged to be installed and removed transaxially of the piston rod rather than axially thereof so as to avoid the necessity for disconnecting the rod eye and associated apparatus.

The snubber may include conventional metal primary seals within the head with the split seal serving as a secondary or back-up seal, illustratively comprising a drain-back seal. An outer annular wiper may be further provided to function as a dirt seal at the outer end of the bushing.

The secondary seal may be disposed at the inner end of the bushing so as to be effectively retained between the bushing and the head. The bushing may be provided with a suitable recess for retaining the secondary seal under a suitable radial constriction so as to cause the split seal to effectively define a closed ring slidably sealingly engaging the piston rod.

The wiper may similarly comprise a split element constrictively retained in an outwardly opening recess of the bushing so as to effectively define a closed ring wiping the outer end of the piston rod.

The bushing is constructed to be selectively spaced from the head on the piston rod so as to expose the secondary seal for selective removal and installation without removal of the rod eye. Once the secondary seal is exposed by the outward movement of the bushing, it may be removed transaxially of the piston rod, with a new split seal being installed transaxially about the rod.

The secondary seal may be biased into sealing engagement with the piston rod by a conventional follower ring and spring biasing means which, in the illustrated embodiment, may be disposed in a recess within the head confronting the seal recess in the bushing.

The secondary seal may be formed of a suitable resilient material, such as a synthetic resin or elastomer, and in the illustrated embodiment comprises a molded split ring.

The primary seals may comprise commercial metal critical leakage piston rings effectively minimizing leakage therepast.

The split secondary seal may be effectively retained in closed ring sealing engagement with the piston rod not only by the constrictive action of the undersized recess in which the sealing portion is received but also by the radial inward urging of the seal by an axial compression thereof. Thus, the secondary seal may define an effective drain-back seal effectively precluding outward leakage of any liquid which may pass the primary seals.

The snubber device of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a snubber device embodying the invention with a portion thereof shown in diametric section to facilitate illustration of the invention;

FIG. 2 is a fragmentary enlarged diametric section illustrating the improved removable seal means of the invention;

FIG. 3 is a fragmentary enlarged view similar to that of FIG. 2 but showing the seal means in the exposed arrangement of the snubber;

FIG. 4 is an end view of the secondary seal thereof; and

FIG. 5 is an end view of the outer wiper thereof.

DESCRIPTION OF THE PREFERRED EMBODIMENT

In the exemplary embodiment of the invention as disclosed in the drawing, a snubber device generally designated 10 is shown to comprise a fluid power piston and cylinder device having a piston 11 movably received within a cylinder tube 12 closed at one end by an end cap 13 and at the other end by a head 14. The piston 11 is provided with a piston rod 15 extending outwardly from the piston chamber 16 through an axial bore 17 of the head 14.

Head 14 may be provided with a connector 18 to provide a structural attachment of the snubber, such as to a post 19. End cap 13 may be provided with suitable passages 20 for use in controlling fluid flow into and from the piston chamber 16 at the left end of the piston, as seen in FIG. 1. Head 14 may be provided with suitable passages 21 for providing fluid flow into and from the piston chamber 16 to the right of the piston, as seen in FIG. 1. A suitable reservoir, or tank, (not shown) may be connected between a pair of passages 20 and 21 to compensate for the different amount of hydraulic fluid required to fill the tension side of the piston chamber 16 as compared to that required to fill the compression side. Additionally, such a reservoir may be provided to supply an additional quantity of hydraulic fluid when the temperature drops below a preselected temperature and to accommodate the overflow of hydraulic fluid when the temperature rises above the preselected temperature. The snubber functions in the normal manner to permit a slow movement of the piston 11 axially through the cylinder tube 12 while snubbing excessive loads such as may occur in a seismic event where the snubber is used in a nuclear power apparatus.

The outer end 22 of the piston rod may be provided with a suitable connector, such as rod eye 23. The rod eye may be threadedly connected to the piston rod end 22, and in the illustrated embodiment, is connected thereto by a threaded portion 24 threadedly received in an axial threaded recess 25 of the piston rod end 22. As shown in FIG. 1, the rod eye 23 may be provided wth an eye opening 26 through which extends an element 27, the movement of which is to be snubbed by snubber 10. In the illustrated embodiment, the element 27 comprises a pipe with snubber 10 acting to prevent excessive force transmission thereto such as during a seismic event.

Pipe 27 is extended through the eye 26 after the rod eye 23 is fully threaded onto the end 22 of piston rod 15. Prior to such installation, the annular head 14 may be axially moved along the piston rod into sealed relationship with the cylinder tube 12, as seen in FIG. 1.

As best seen in FIGS. 2 and 3, head 14 is provided with a radially and axially inwardly opening recess 28 in which is received a pair of metal rod seals 29 defining the primary seal means of the snubber. The seals are carried by spacer separators 30 and retained in the recess by a back-up washer 31 and a pair of retaining rings 32. The seals 29 comprise commercial critical leakage piston rings which effectively minimize leakage of the hydraulic fluid from piston chamber 16.

As indicated briefly above, the present invention is concerned with the provision of a secondary seal outwardly of the primary seals 29, which may be readily removed and installed without the need for removing the rod eye 23 and thereby effectively minimizing downtime in the servicing of the secondary seals. The secondary seal generally designated 33 is generally similar to the seal disclosed in the above-identified Flick Pat. No. 3,190,702. More specifically, seal 33 includes an annular seal element 34 having an outer portion 35 and an inner portion 36. The inner portion is biased against the piston rod 15 by a wave spring 37 acting against a follower ring 38. The follower ring and biasing spring may be carried in a cage 39 removably received in an axially outwardly, radially inwardly opening recess 40 in the head 14 and having an outer turned flange 41 abutting the outer portion 35 of the seal ring 34.

Head 14 further defines an axially outwardly, radially inwardly opening recess 42 receiving an annular bushing 43 having an axially inwardly, radially inwardly opening recess 44 receiving the outer portion 35 of the seal ring 34. The bushing includes an outwardly projecting end portion 45 provided with an axially outwardly, radially inwardly opening recess 46 receiving an annular wiper 47 for preventing the introduction of dust or dirt into the bore 48 of the bushing. The wiper may be retained in the recess 46 by a removable securing ring 49 mounted to a retainer ring 50, in turn secured to the head 14 by suitable means, such as threaded bolts 51. Thus, as shown in FIG. 3, the retainer 50 may be provided with a through bore 52 aligned with a threaded recess 53 in the head for selective retention of the retainer 50 to the head by bolts 51.

As best seen in FIG. 3, bushing 43 is axially movable on piston rod 15 to a position spaced outwardly from head 14 sufficiently to provide access to the seal ring 34. In the illustrated embodiment, seal ring 34 comprises a split ring formed of molded synthetic resin or elastomeric material. In the illustrated embodiment, the seal ring is formed of ethylene propylene. Seal ring 34 comprises a split seal ring having an unconstricted diameter slightly greater than the diameter of the annular surface 54 defining the radially outer surface of recess 44. Thus, when the outer portion 35 of seal ring 34 is installed in the recess 44, as shown in FIG. 3, the seal ring is constricted to define an effectively closed ring.

When the bushing 43 with seal ring 34 installed therein is brought from the accessible position of FIG. 3 to the installed position of FIG. 2, the bushing may be secured to the head 14 by means of the retainer ring 50 and bolts 51. The seal ring is further axially compressed in the bushing recess 44 so as to provide a further urging of the seal ring into sealing engagement with the piston rod 15 in the installed arrangement of the seal ring as shown in FIG. 2.

In the illustrated embodiment, wiper 47 comprises a split ring which may be formed of the same material as seal ring 34. As indicated above, wiper 47 is provided as a dirt seal and may be somewhat more loosely retained on the piston rod.

As can best be seen in FIG. 3, when the bushing 43 is spaced axially outwardly from the head 14, each of the seal ring 34 and wiper 46 is exposed for facilitated removal. As each of these elements comprises a split ring, the element may be removed transaxially of the piston rod without the need for removal of the connector 23, thereby effectively minimizing the downtime in servicing the seal and wiper. Each of the seal ring 34 and wiper 47 is suitably compressed by the undersize configuration of the recess in which it is installed in bushing 43 so as to effectively define a closed ring configuration, as shown in FIGS. 4 and 5, in the installed arrangement of the snubber.

As indicated briefly above, the secondary seal 33 effectively comprises a back-up seal for the main seals 29. In the illustrated embodiment, the head 14 is provided with a drainback passage 55 inwardly of the seal 33 whereby the seal 33 effectively comprises a drainback seal.

In the illustrated embodiment, the snubber elements other than the seal 34 and wiper 47 may be formed of suitable radiation-resistant material, such as metal. Thus, the present invention permits facilitated servicing of the degradable seal elements, permitting effectively minimized downtime in the use of the snubber such as in nuclear power environments.

The foregoing disclosure of specific embodiments is illustrative of the broad inventive concepts comprehended by the invention.

I claim:

1. In a device having a cylinder tube, a piston longitudinally movable in said tube, a head extending across one end of said tube and having a through bore, a piston rod extending from said piston outwardly through said bore, and primary seal means movably sealing said piston rod to said head, improved readily removable back-up seal means for further movably sealing the piston rod to said head, comprising:
   a bushing having a through bore;
   means for separably securing the bushing to said head with said piston rod extending coaxially outwardly from said head through said bushing bore; and
   a split annular back-up seal disposed between said bushing and said head, said bushing being constructed to be selectively spaced from said head on said piston rod to expose said back-up seal for selective removal and installation thereof transaxially of said piston rod, said back-up seal being radially constricted to define an effectively closed ring slidably sealingly engaging said piston rod.

2. The device of claim 1 wherein said back-up seal is disposed in a recess portion of said bushing bore.

3. The device of claim 1 wherein an annular follower ring is biased axially against said back-up seal to provide a ring closing biasing of said back-up seal.

4. The device of claim 1 wherein said back-up seal comprises a molded synthetic resin element.

5. The device of claim 1 wherein said back-up seal is disposed in a recess portion of said bushing bore and biasing means are disposed in a recess portion of said head to provide a ring closing biasing of said back-up seal.

6. The device of claim 1 wherein a split annular wiper is provided on said bushing outwardly of said back-up seal to be accessible for removal and installation thereof transaxially of said piston rod outwardly of said bushing.

7. The device of claim 1 wherein said bushing securing means comprises threaded means removably secured to said head.

8. The device of claim 1 wherein said head defines an axially outwardly opening recess at the outer end of said head through bore, said bushing being removably received in said recess.

9. The device of claim 1 wherein said head and bushing define confronting annular recesses opening radially into the bores thereof, said back-up seal having an inner portion received in the head recess and an outer portion received in the bushing recess whereby at least one portion of the back-up seal is exposed when the bushing is moved axially away from said head on said piston rod.

10. The device of claim 1 wherein said bushing defines an axially inward annular recess opening radially inwardly to said bushing bore and having a diameter preselected to cause said back-up seal disposed there to be constricted to said closed ring configuration.

11. The device of claim 1 wherein said back-up seal comprises a molded elastomeric element.

12. In a fluid-operated snubber device for use in a radioactive environment, said device having a cylinder tube, a piston longitudinally movable in said tube, a head extending across one end of said tube and having a through bore, a piston rod extending from said piston outwardly through said bore, a connector on an outer portion of said piston rod, and primary seal means movably sealing said piston rod to said head, all of which elements being formed of metal, improved readily removable secondary seal means for further movably sealing the piston rod to said head, comprising:
   a bushing having a through bore;
   means for separably securing the bushing to said head with said piston rod extending coaxially outwardly from said head through said bushing bore; and
   a split annular nonmetallic seal disposed between said bushing and said head, said bushing being constructed to be selectively spaced from said head on said piston rod to expose said split seal for selective removal and installation thereof transaxially of said piston rod without removing said connector, said split seal being radially constricted to define an effectively closed ring slidably sealingly engaging said piston rod.

13. The fluid-operated snubber device of claim 12 wherein said split seal comprises a molded synthetic elastomeric element.

14. The fluid-operated snubber device of claim 12 wherein a split annular wiper is provided in said head outwardly of said secondary seal means for wiping the piston rod, said split seal and wiper being formed of similar material.

15. The fluid-operated snubber device of claim 12 wherein said bushing is provided with an annular radially inwardly opening recess having an outer diameter smaller than the unconstricted outer diameter of said split seal, said split seal being received therein and effectively constricted thereby to said closed ring configuration.

* * * * *